(12) United States Patent
Wyner et al.

(10) Patent No.: US 9,182,785 B2
(45) Date of Patent: Nov. 10, 2015

(54) PROTECTIVE CASE AND METHODS OF MAKING

(75) Inventors: Daniel M. Wyner, North Scituate, RI (US); Richard B. Fox, Smithfield, RI (US); Richard L. Garrard, Newport, RI (US); Thomas F. Cafaro, Foster, RI (US); Maria E. Macrina, Providence, RI (US); Stephanie Thorn, Chepachet, RI (US)

(73) Assignee: G-Form, LLC, Providence, RI (US)

( * ) Notice: Subject to any disclaimer, the term of this patent is extended or adjusted under 35 U.S.C. 154(b) by 0 days.

(21) Appl. No.: 13/447,093

(22) Filed: Apr. 13, 2012

(65) Prior Publication Data

US 2012/0261289 A1 Oct. 18, 2012

Related U.S. Application Data

(60) Provisional application No. 61/475,639, filed on Apr. 14, 2011, provisional application No. 61/612,390, filed on Mar. 18, 2012, provisional application No. 61/612,949, filed on Mar. 19, 2012.

(51) Int. Cl.
| | |
|---|---|
| *B65D 85/00* | (2006.01) |
| *G06F 1/16* | (2006.01) |
| *A45C 11/00* | (2006.01) |
| *A45C 11/26* | (2006.01) |

(52) U.S. Cl.
CPC ............. *G06F 1/1626* (2013.01); *A45C 11/00* (2013.01); *A45C 11/26* (2013.01); *A45C 2011/002* (2013.01); *G06F 2200/1633* (2013.01)

(58) Field of Classification Search
CPC ..................................................... A45C 11/00
USPC .................................. 206/320, 588, 589, 590
See application file for complete search history.

(56) References Cited

U.S. PATENT DOCUMENTS

| | | | |
|---|---|---|---|
| 4,243,140 | A | 1/1981 | Thrun |
| 4,901,852 | A | 2/1990 | King |
| 5,180,060 | A | 1/1993 | Forti |
| 5,265,720 | A | 11/1993 | Meliconi |
| 5,622,262 | A | 4/1997 | Sadow |
| 5,819,942 | A * | 10/1998 | Sadow .......................... 206/522 |
| 6,109,434 | A | 8/2000 | Howard, Jr. |
| 6,131,734 | A | 10/2000 | Hollingsworth et al. |
| 6,237,766 | B1 | 5/2001 | Hollingsworth |
| 6,334,533 | B1 | 1/2002 | Hollingsworth et al. |
| 6,334,534 | B1 | 1/2002 | Hollingsworth et al. |
| 6,390,297 | B1 | 5/2002 | Hollingsworth et al. |
| 7,938,260 | B2 | 5/2011 | Lin |
| 2001/0010845 | A1* | 8/2001 | Hoffman et al. ............. 428/34.2 |
| 2001/0024947 | A1 | 9/2001 | Fuhrmann et al. |
| 2002/0060165 | A1 | 5/2002 | Weder |
| 2002/0175096 | A1* | 11/2002 | Linihan ......................... 206/305 |

(Continued)

FOREIGN PATENT DOCUMENTS

| | | | |
|---|---|---|---|
| WO | WO 92/07372 | 4/1992 | |
| WO | WO 2008083408 A2 * | 7/2008 | ............... B32B 3/12 |

*Primary Examiner* — Steven A. Reynolds
*Assistant Examiner* — King M Chu
(74) *Attorney, Agent, or Firm* — Michele J. Young

(57) ABSTRACT

Disclosed is a protective case for an electronic device. The protective case has two layers, an inner cushion insert that surrounds a portion of the electronic device and an outer elastomeric shell. The cushion insert includes raised impact portions that extend through the cover, and that are capable of absorbing shocks from impacts.

34 Claims, 20 Drawing Sheets

(56) References Cited

U.S. PATENT DOCUMENTS

| | | |
|---|---|---|
| 2004/0025993 A1 | 2/2004 | Russell |
| 2004/0137816 A1* | 7/2004 | Todt ............................... 442/149 |
| 2005/0249917 A1 | 11/2005 | Trentacosta et al. |
| 2007/0158220 A1 | 7/2007 | Cleereman et al. |
| 2007/0261978 A1 | 11/2007 | Sanderson |
| 2008/0166524 A1* | 7/2008 | Skaja et al. .................... 428/166 |
| 2010/0006468 A1 | 1/2010 | Lin |
| 2010/0089779 A1 | 4/2010 | Bowers |
| 2010/0096284 A1 | 4/2010 | Bau |
| 2010/0104814 A1 | 4/2010 | Richardson et al. |
| 2010/0147737 A1* | 6/2010 | Richardson et al. .......... 206/701 |
| 2011/0277923 A1* | 11/2011 | Fox et al. ....................... 156/245 |
| 2012/0018323 A1 | 1/2012 | Johnson et al. |
| 2012/0018325 A1* | 1/2012 | Kim ............................... 206/320 |
| 2012/0031788 A1* | 2/2012 | Mongan et al. ................ 206/320 |
| 2012/0037524 A1 | 2/2012 | Lonsdale, II et al. |
| 2012/0084896 A1 | 4/2012 | Wyner et al. |
| 2012/0091025 A1 | 4/2012 | Wyner et al. |
| 2012/0305422 A1* | 12/2012 | Vandiver ....................... 206/320 |

* cited by examiner

PROTECTIVE CASE AND METHODS OF MAKING

CROSS-REFERENCE TO RELATED APPLICATIONS

This application claims the benefit of U.S. Provisional Application No. 61/475,638, which was filed on Apr. 14, 2011, U.S. Provisional Application No. 61/612,930, which was filed on Mar. 18, 2012, and U.S. Provisional Application No. 61/612,949, which was filed on Mar. 19, 2012, the disclosures of which are expressly incorporated herein by reference in their entirety.

TECHNICAL FIELD

The present invention relates generally to cases designed to protect sensitive items form damage and/or to provide an exterior surface that is comfortable to touch.

BACKGROUND

Numerous different types of electronic devices currently exist for communication, entertainment and other purposes. These include cell phones, MP3 players, video players, smartphones, communication devices, such as walkie-talkies, navigation devices, such as GPS devices, and other types of electronic devices, such as various types of computers, including laptop computers, hand-held computers, ultra-mobile computers and tablet computers. These devices often include touch screens, interactive panels including, but not limited to, capacitive coupled interfaces, keyboards, scroll wheels, tilt switches, push button switches, and other interactive controls. Due to the sensitive nature of these electronic devices, it is desirable to provide protection for these devices.

SUMMARY

Disclosed in one embodiment is a protective case for an electronic device, comprising a cover that conforms to and engages a portion of the electronic device, that cover having a back portion and a sidewall connected to the back portion, the cover comprising interconnected support members defined by a plurality of receiving apertures disposed in predetermined areas, the cover comprising a predetermined thickness of an elastomeric material; and a cushion insert comprising raised impact regions disposed adjacent to first recessed impact regions, the raised impact regions disposed in predetermined areas corresponding to the plurality of receiving apertures and having a predetermined thickness greater than the thickness of the cover. When the protective case is assembled onto the electronic device, the plurality of interconnected support members engage with the first recessed impact regions, such that the cover conforms the cushion insert to the electronic device, and the raised impact regions engage with the plurality of receiving apertures, such that the raised impact regions extend above the outer surface of the cover. The protective case also may include one or more second recessed impact regions, wherein the thickness of the second recessed impact regions is less than the thickness of the first recessed impact regions.

Disclosed in another embodiment is a protective case for an electronic device, comprising a cover having a back portion and a sidewall connected to the back portion that engages the electronic device, the cover comprising a material that conforms to a portion of the electronic device, the cover having a predetermined thickness, and a cushion insert comprising a rate dependent material, such that when the cushion insert is disposed in the cover, the cover conforms the cushion insert to the electronic device. The cover further can comprise interconnected support members defined by a plurality of receiving apertures disposed in predetermined areas. The cushion insert further can comprise raised impact regions disposed adjacent to first recessed impact regions portions, the raised impact regions disposed in predetermined areas corresponding to the plurality of receiving apertures and having a predetermined thickness greater than the thickness of the cover, the raised impact regions engaged with the plurality of receiving apertures such that the raised impact regions are coplanar with the outer surface of the cover, and the plurality of interconnected support members disposed in, and engaged with, the first recessed impact regions portions, when the cover conforms the cushion insert to the electronic device.

Disclosed in another embodiment is a protective case comprising a cover that conforms to and engages a portion of the electronic device, that cover having a back portion and a sidewall connected to the back portion, the cover comprising interconnected support members defined by a plurality of receiving apertures disposed in predetermined areas, the cover comprising a predetermined thickness of an elastomeric material having a durometer ranging from about 80 Shore A to about 100 Shore A; a multi-layer cushion insert comprising raised impact regions disposed adjacent to first recessed impact regions, the raised impact regions disposed in predetermined areas corresponding to the plurality of receiving apertures and having a predetermined thickness greater than the thickness of the cover, the cushion insert comprising a multi-layer continuously bonded material comprising a rate dependent foam disposed between opposing layers of a thermoplastic elastomeric material (TPE), and a reinforcing layer disposed between the rate dependent foam layer and one of the TPE layers; one or more second recessed impact regions having a thickness less than the thickness of the first recessed impact regions. When the protective case is assembled onto the electronic device, the plurality of interconnected support members engage with the first recessed impact regions, such that the cover conforms the cushion insert to the electronic device, and the raised impact regions engage with the plurality of receiving apertures, such that the raised impact regions extend above the outer surface of the cover.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Referring now to the Figures, the features and advantages of the present disclosure will be apparent from the following more particular description of exemplary embodiments, as illustrated in the accompanying drawings, in which like reference characters refer to the same parts throughout the different views. The drawings are not necessarily to scale, emphasis instead being placed upon illustrating the principles of the disclosure.

DETAILED DESCRIPTION

The present disclosure is directed to protective impact absorbing and cushioning structures designed to protect sensitive items from damage. The present structures can conform to the contours of the items to be protected, and provide an exterior surface that is comfortable to touch. The present structures include, in some embodiments, both raised and recessed impact regions of various shapes, sizes, configurations and thicknesses. Various materials can be used for the raised impact regions, as will be described below.

The improved cases of the present disclosure comprise interconnected but separable inner and outer case parts that substantially conform to the outer surface of the item to be protected. The case can be designed to have specific functional characteristics such as, for example, targeted impact protection on case edges and corners. By combining specific shapes, sizes, configurations, contours and orientations of raised and recessed impact regions, the case can be adapted for any type of product that requires protection, in addition to those mentioned above.

For example, the present cases can be adapted into sleeves or cases that correspond to the shape and size of an electronic device, such as a laptop computer or a tablet device, such that they fit snugly, but also stretch and conform to the exterior of the case. As such, the case can be formed in shapes that would conform at least in part to the outer surface of the encased product. The cases described herein also may be adapted for luggage, athletic protective gear, and the like.

Such protective cases can provide lightweight and flexible impact-resistant protection, and can be aesthetically pleasing, more durable and lower in cost than other cases. For ease of discussion, the term "flexible," as used herein, means the ability of the pad to move by bending, twisting, flexing and/or stretching, and the like. The construction of the present cases are rugged, durable, and able to withstand the temperatures, detergents and mechanical action used in industrial and/or commercial laundering, unlike other cases, which may degrade under such harsh conditions.

Figure 1:
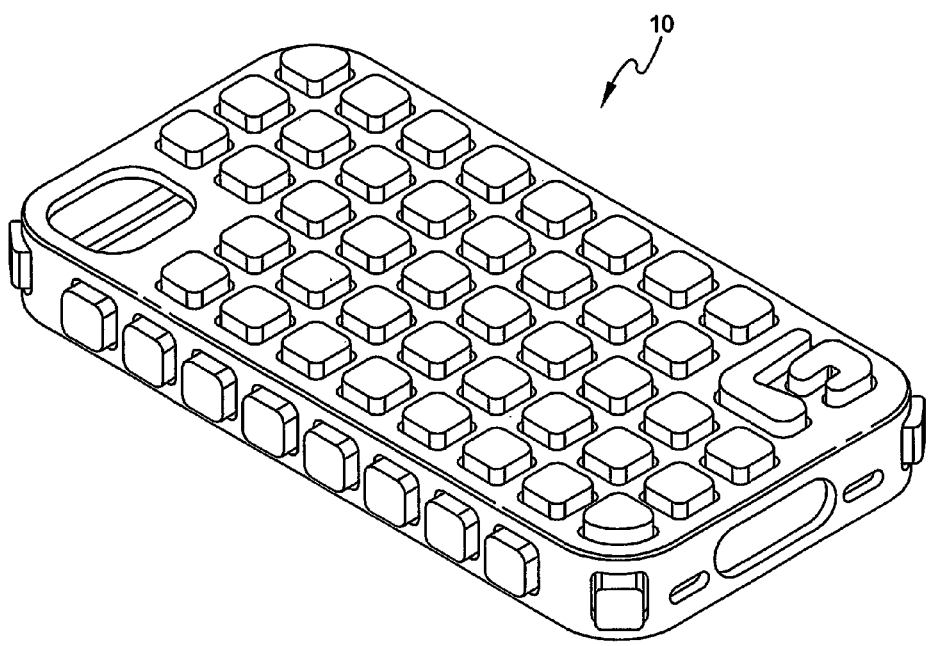
FIG. 1 is a perspective view of an exemplary protective case according to the present disclosure, in an assembled configuration.
Figure 1A:
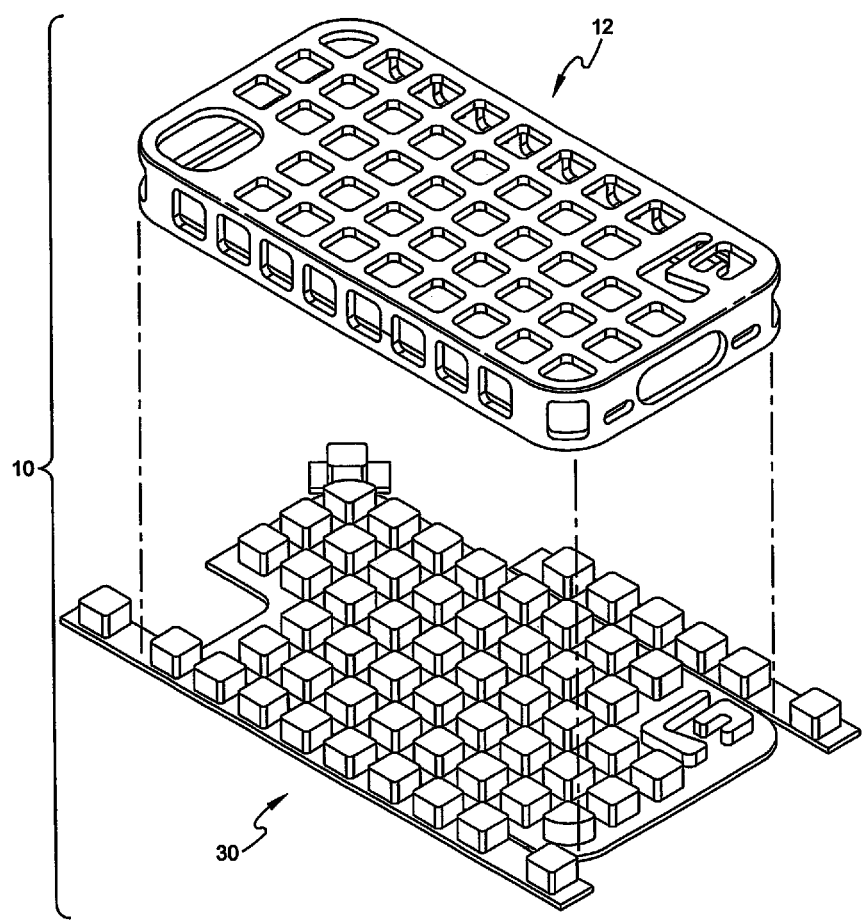
FIG. 1A is an exploded perspective view of the protective case shown in FIG. 1.
Figure 2:
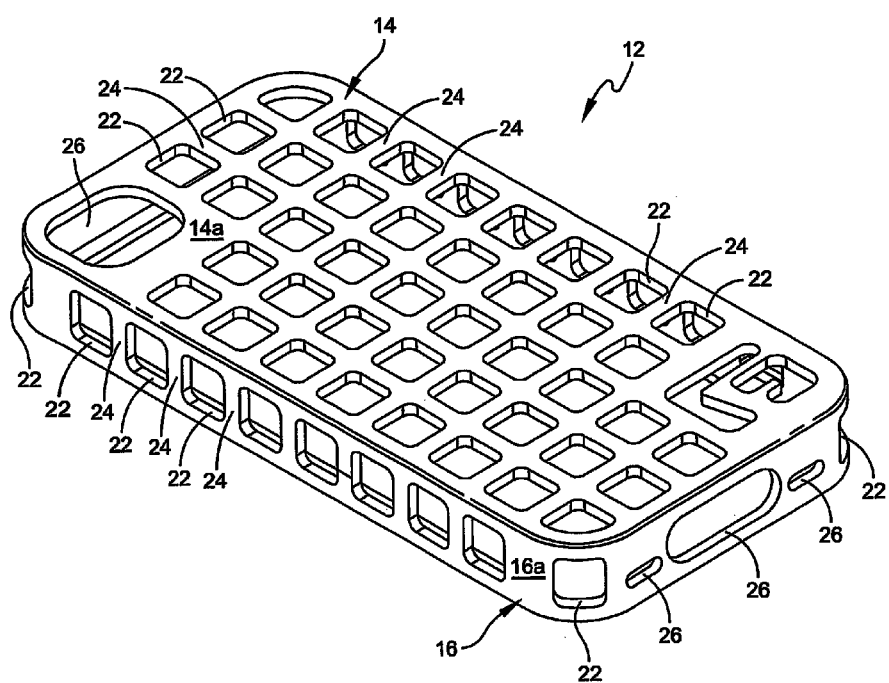
FIG. 2 is perspective front view of the cover of the protective case, shown in FIG. 1A.
Figure 3:
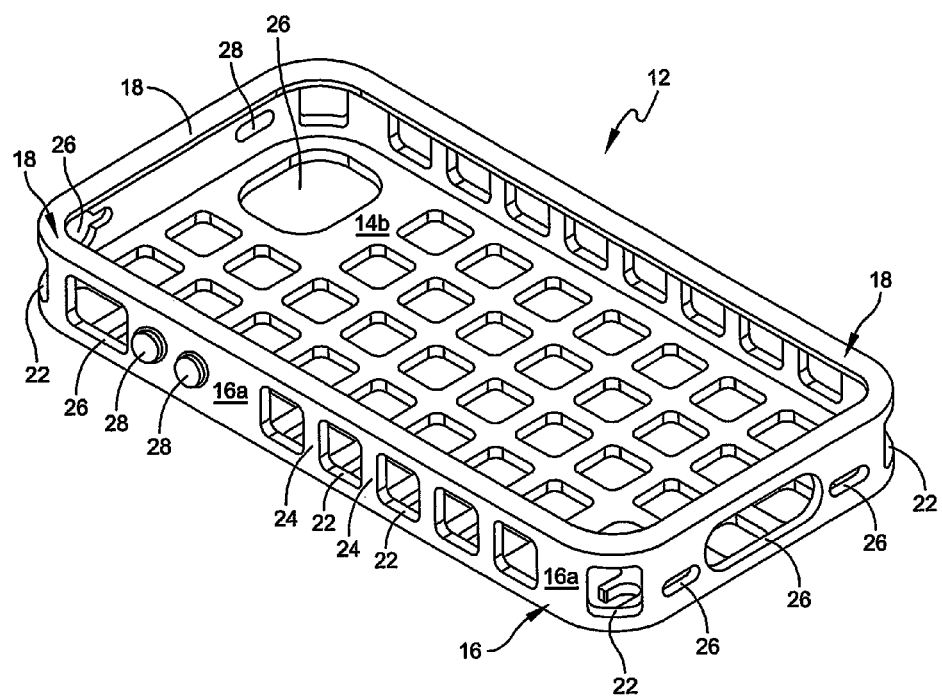
FIG. 3 is perspective back view of the cover of the protective case, shown in FIG. 1A.

FIGS. 1-13, when taken together, show one exemplary embodiment of the present disclosure, which is directed to a protective case 10 for an electronic device (not illustrated), such as a media device or cell phone. Although described herein with reference to a protective case for an electronic device, as noted above, the protective case may be adapted to any product that requires protection or that is designed to provide protection. Case 10 is shown in an assembled configuration in FIG. 1, and in a disassembled configuration in FIG. 2. As shown, case 10 comprises a cover 12 and a cushion insert 30, which may be interconnected when assembled, as shown in FIG. 1, but are otherwise separable from one another, as shown in FIG. 2. In the present embodiment, cover 12 is a single, unitary part, but if desired, it may be formed as two or more separable but interlocking parts that can be assembled onto the surfaces of the electronic device. Similarly, the cushion insert 30 may comprise two or more parts that can be inserted into cover 12.

Cover 12 may be constructed to conform to the exterior surface of at least a portion of the cushion insert 30. Cover 12 comprises a back section 14, a sidewall 16 extending upwardly from the back section 14, and a bezel 18 extending inwardly from the sidewall 16 to define a front opening 20. Each of the back section 14, sidewall 16 and front bezel 18 comprises opposing inner surfaces 14a,16a,18a and outer surfaces 14b,16b,18b, respectively.

One or both of the back section 14 and sidewall 16 comprises a plurality of receiving apertures 22 extending from the inner surfaces 14a,16a to the outer surface 14b,16b, to define a plurality of interconnected support members 24 disposed between the receiving apertures 22.

The cover 12 also comprises one or more functional apertures 26 that correspond in shape, size and location to the size, shape and location of various functional keys, ports, devices or other items that may be included on the electronic device (none of which are illustrated herein), to keep such items free of obstruction. Examples of such functional keys include, but are not limited to, charging ports, speakers, auxiliary ports, power keys, camera lenses, and the like.

Cover 12 also comprises one or more raised keys 28 that correspond in shape, size and location to the size, shape and location of smaller functional keys or ports (also not illustrated herein) to which access may be limited due to the thickness of the case, to allow the user to maintain functional access without removing the case from the electronic device.

Examples of such smaller functional keys include, but are not limited to, power and volume keys.

The cover 12 may be formed of a substantially rigid, semi-rigid and/or flexible material, and has a size and configuration corresponding to and cell phone, with sufficient space between the inner surface of the cover and the outer surface of the cell phone, to allow the cushion insert to be disposed therein. In the present embodiment, cover 12 is unitary, and comprises an elastomeric material that is flexible and capable of stretching sufficiently to allow the electronic device to slide easily into and be removed from case 10. The cover 12 has sufficient elasticity to stretch over the electronic device, and to recover so that the cover fits snugly over the cushion insert and on the electronic device, such that the case 10 conforms to the electronic device. The cover 12 can be made of a variety of thermoset materials, such as synthetic rubber, silicon, urethane and other materials that are capable of stretching sufficiently to allow the electronic device to slide into the front opening 20 of the cover 12 while maintaining the form-fitting shape of the cover 12. The density and elasticity of the cover 12, as well as the pre-forming of the cover 12 to fit the shape of electronic device, allows the material of the cover 12 to both stretch and recover so that the cushion cover fits tightly on the electronic device. When rigid or semi-rigid, it may be desirable for the cover 12 to comprise two or more separable but interlocking parts that can be assembled onto the front and rear surfaces of the cell phone. The cover 12 can be formed using a variety of techniques and processes suitable for processing the foregoing materials, which are known in the art.

In the present embodiment, cover 12 has a predetermined thickness $T_1$ that is selected to be less than the thickest section of the cushion insert $T_2$, as will be described below. In the present embodiment, the thickness $T_1$ ranges from about 0.050" to about 0.090", more particularly about 0.060" to about 0.080", more particularly still about 0.075".

Figure 4:
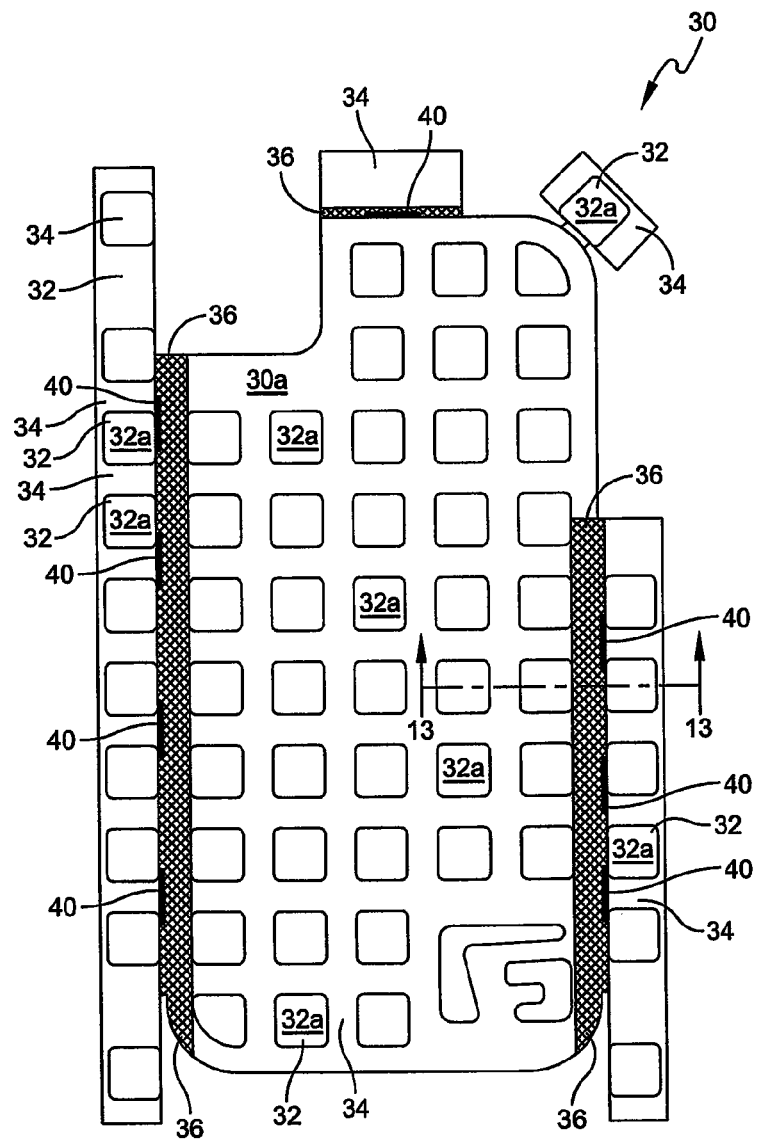
FIG. 4 is top view of the cushion insert of the protective case, shown in FIG. 1A.
Figure 5:
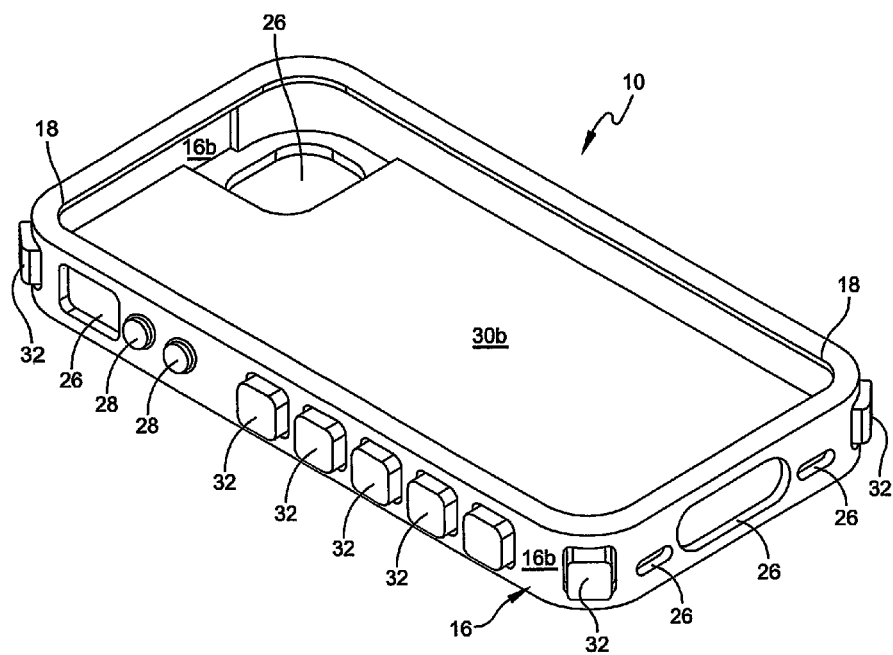
FIG. 5 is perspective back view of the protective case shown in FIG. 1.
Figure 6:
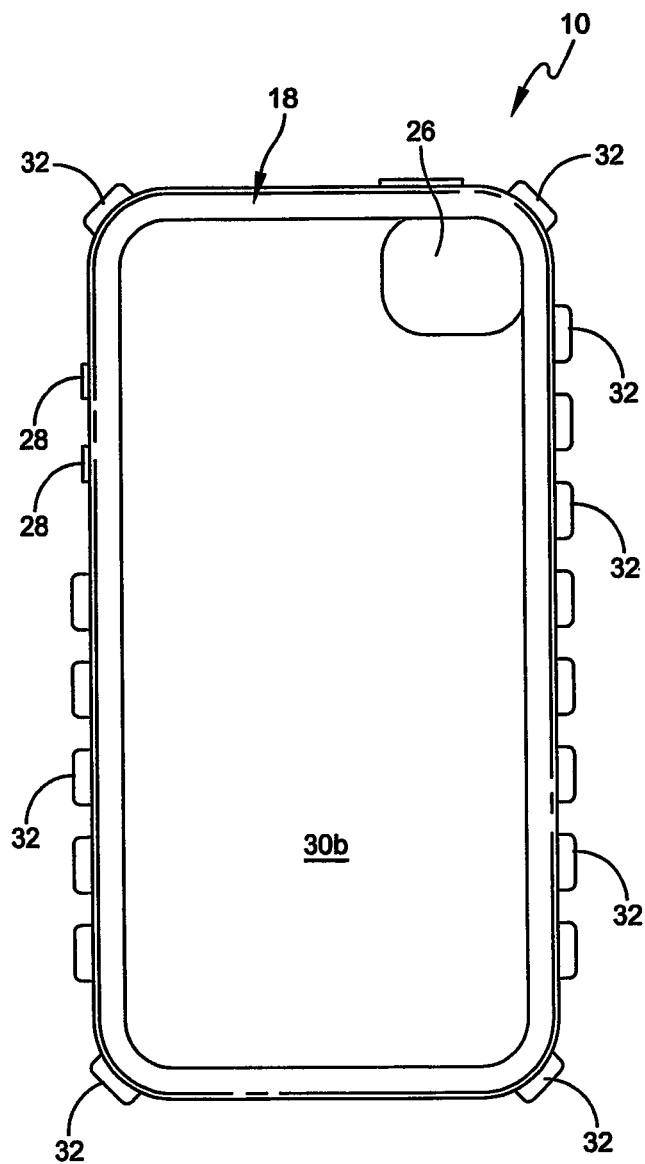
FIG. 6 is a back view of the protective case shown in FIG. 1.
Figure 7:
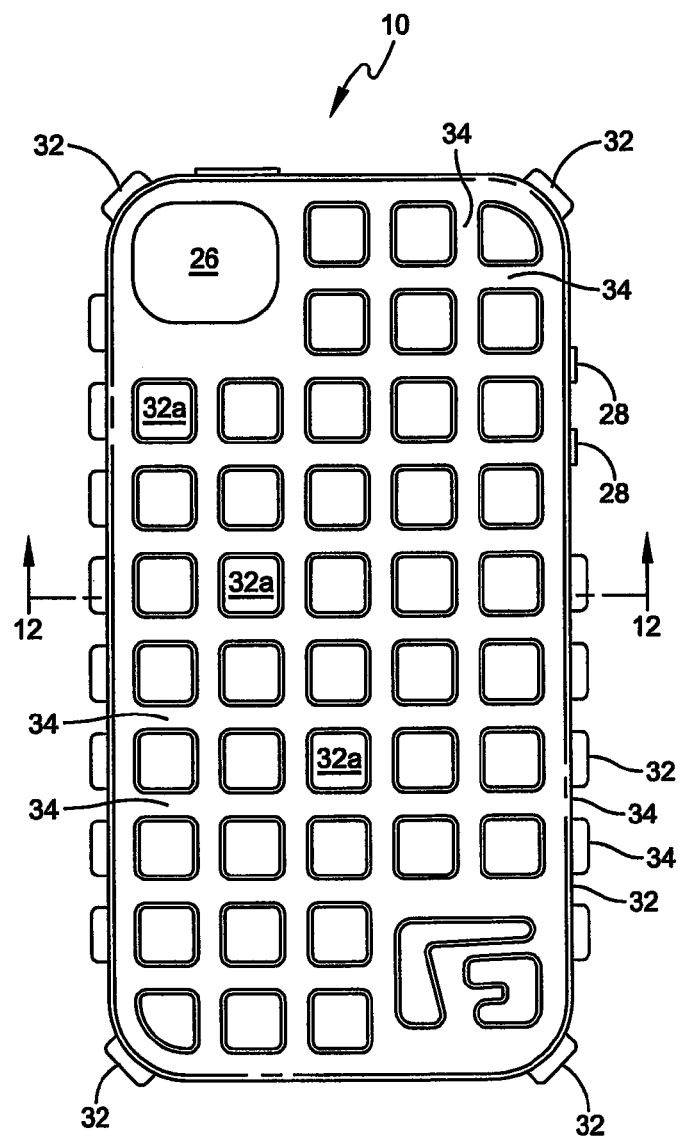
FIG. 7 is a front view of the protective case shown in FIG. 1.
Figure 8:
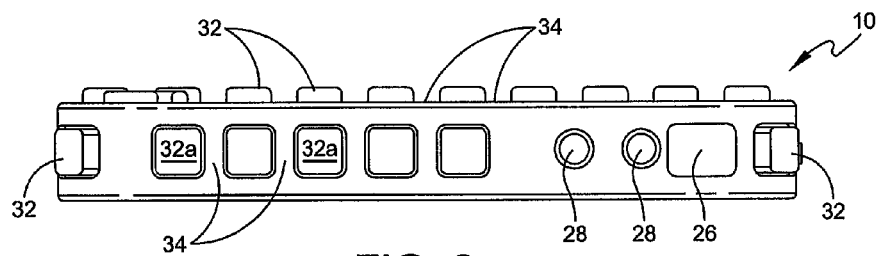
FIG. 8 is a left side view of the protective case shown in FIG. 1.
Figure 9:
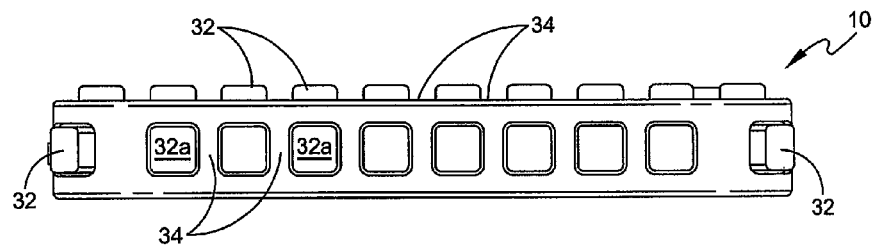
FIG. 9 is a right side view of the protective case shown in FIG. 1.
Figure 10:
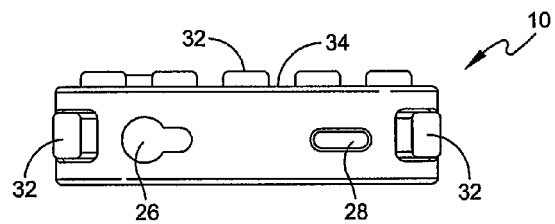
FIG. 10 is a top view of the protective case shown in FIG. 1.
Figure 11:
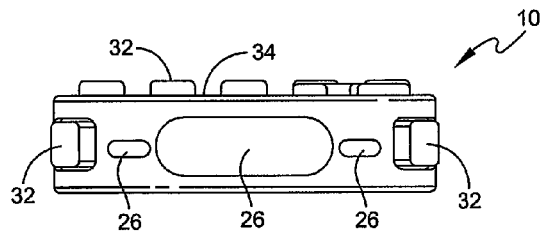
FIG. 11 is a bottom view of the protective case shown in FIG. 1.
Figure 13:
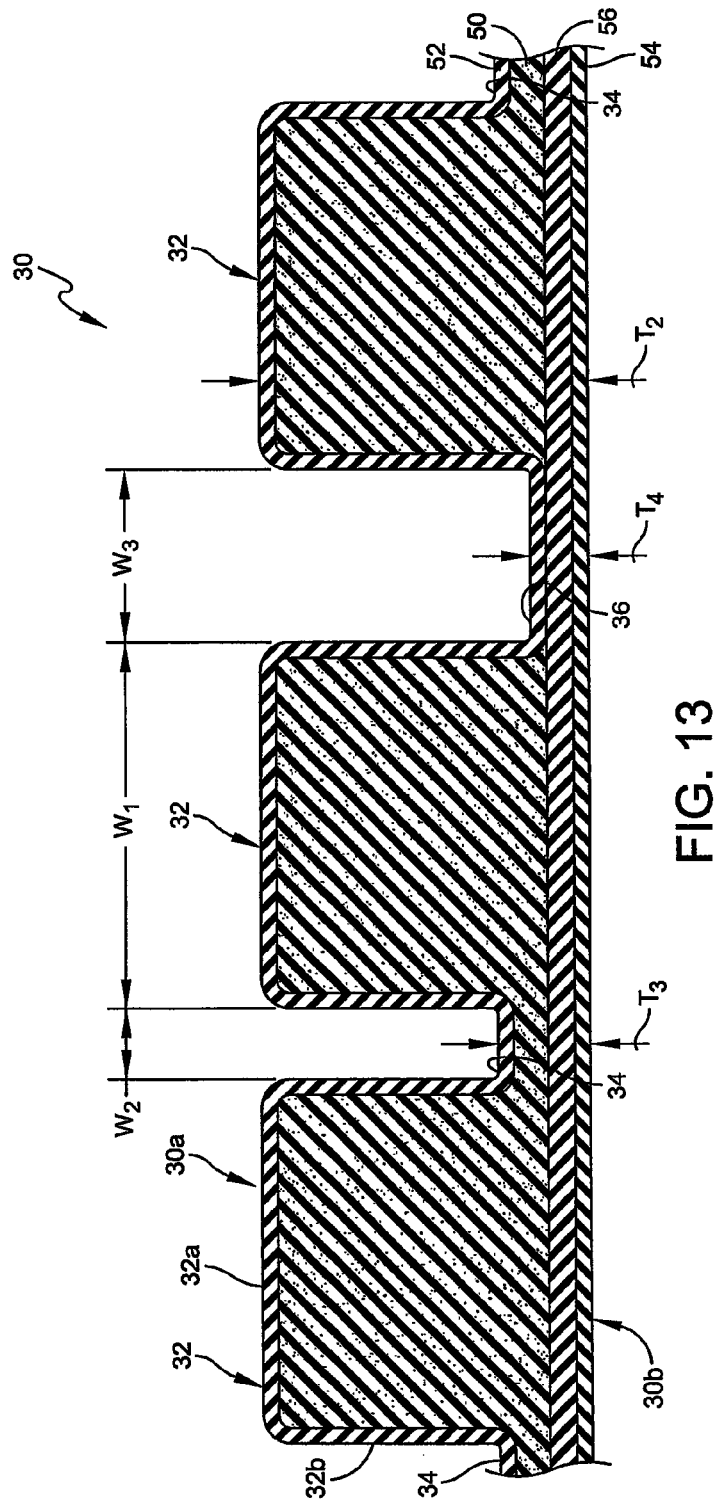
FIG. 13 is cross-sectional view of the cushion insert shown in FIG. 11, through line 13-13.

FIGS. 4 and 13 illustrate the cushion insert 30 in greater detail. The cushion insert 30 may be constructed to conform to at least a portion of the outer surface of the article it is intended to encase which, in this example, is a cell phone. The case insert 30 may be formed from a variety of materials, such that it has a size and configuration corresponding to a portion of the inner surface of the cover and a portion of the outer surface of the cell phone, and a thickness that allows it to fit between the inner surface of the cover and the outer surface of the cell phone to allow it to fit therebetween.

In the present exemplary embodiment, cushion insert 30 comprises spaced apart top and bottom surfaces 30a,b, and a plurality of raised impact regions 32 disposed adjacent to first recessed impact regions 34. The raised impact regions 32 are defined in and extend upwardly from the top surface 30a, and are disposed in predetermined areas corresponding to the plurality of apertures 20 and having a width $W_1$, which may vary as desired, and a predetermined thickness $T_2$ that is selected to be greater than the thickness $T_1$ of the cover 12. In the present embodiment, the width $W_1$ of the raised impact regions 32 is about 0.200" to about 0.400", more particularly about 0.250" to about 0.350", and more particularly still about 0.305"; and the thickness $T_2$ ranges from about 0.150" to about 0.350", more particularly about 0.200" to about 0.300", more particularly still about 0.240".

Raised impact regions 32 are spaced apart from one another by first recessed impact regions 34. First recessed impact regions 34 have a width $W_2$, which may vary as desired, and a predetermined thickness $T_3$, which is selected to be less than the thickness $T_2$ of the raised impact regions 32. In the present embodiment, the width $W_2$ of the first recessed regions 34 is about 0.100" to about 0.200", more particularly about 0.130" to about 0.170", and more particularly still about 0.150"; and the thickness $T_3$ ranges from about 0.025" to about 0.045", more particularly about 0.030" to about 0.040", and more particularly still about 0.035".

Figure 12:
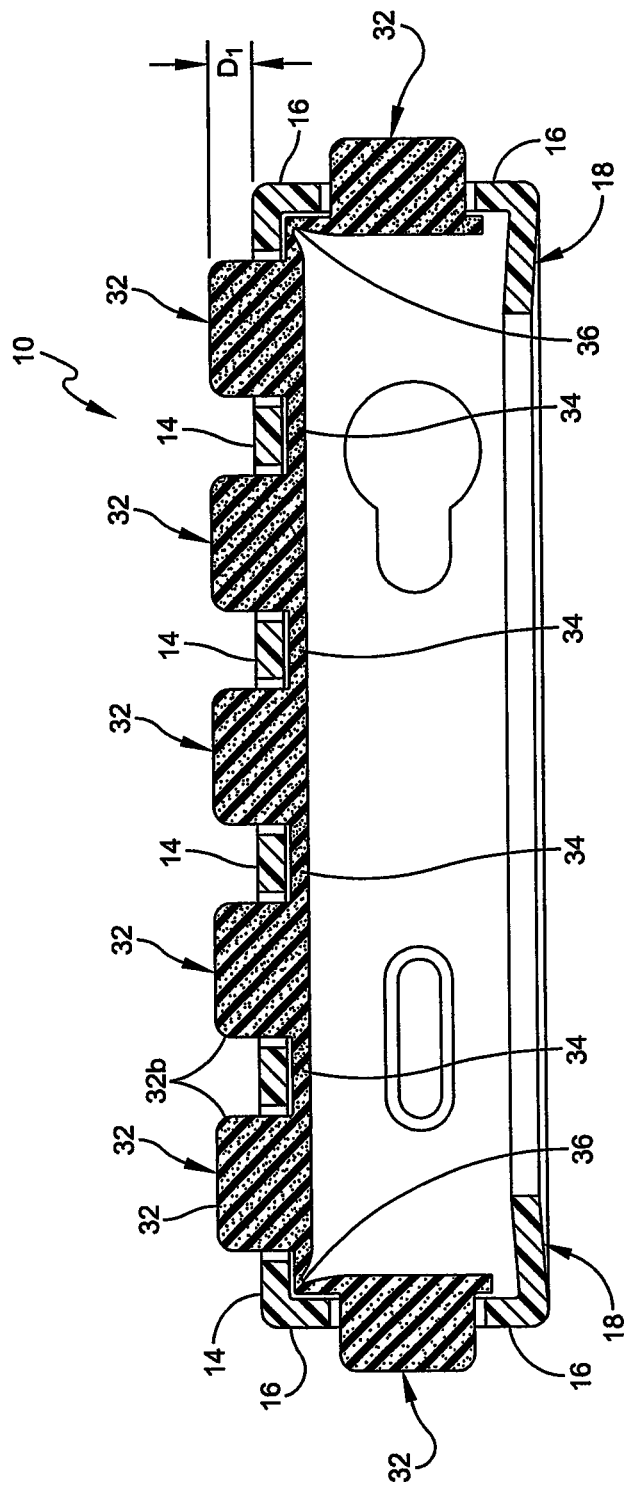
FIG. 12 is cross-sectional view of the protective case shown in FIG. 7, through line 12-12.

The cushion insert 26 also may comprise second recessed impact regions 36 that correspond to the contours, edges and/or corners of the cell phone, to facilitate bending and/or flexing of the cushion insert 26 into the contours, edges and/or corners of cover 12. Second recessed impact regions 36 have a width $W_3$, which may vary as desired, and a predetermined thickness $T_4$, which is selected to be less than the thickness $T_3$ of the first recessed impact regions 36. In the present embodiment, the width $W_3$ of the second recessed regions 36 is about 0.080" to about 0.200", more particularly about 0.100" to about 0.170", and more particularly still about 0.132"; and the thickness $T_3$ ranges from about 0.010" to about 0.030", more particularly about 0.015" to about 0.025", and more particularly still about 0.020". When assembled, the raised impact regions 32 protrude or extend above the outer surface of cushion insert 12 by a distance $D_1$, as shown in FIG. 12.

All of the foregoing thicknesses, widths, distances and spacings may vary, as desired.

In the present embodiment, the raised impact regions 32 comprise an upper surface 32a and sidewalls 32b extending downwardly therefrom. The raised impact regions 32 may have any thickness sufficient to provide a protective or comfortable effect, by protruding above the exterior surface of the cover 12. Thus, for certain functional advantages, the thickness of the raised impact regions 32 may be designed to protrude above the outer surface of the case, when in an assembled configuration. For example, in the present exemplary cell phone device case 10, when assembled, the raised impact regions 32 may protrude or extend above the outer surface 12a of the cover 12 by about 1/16 inch to about 1/2 inch. If desired or needed, and as shown in the present embodiment, the cushion insert 26 also can comprise raised impact regions 32 designed to protrude through the sidewall or the bezel to protect the edges and/or screen from an impact.

The thickness of cushion insert 26 may be varied as desired, but it is desirable for the thickness to be sufficient to protect the device from impact, while remaining thin enough to minimize the total weight of the case.

Although illustrated herein as substantially square, the raised impact regions 32 may have any shape or configuration as is desired to achieve the functional advantage of impact protection, or the aesthetic design intended to appeal to a consumer. The size, shape, quantity, configuration and location of the raised impact regions may be varied as desired in order to achieve the foregoing objectives. For aesthetic purposes, the color of the cover and cushion insert may be the same or different, and also may include text and/or graphics.

The cushion insert 26 also optionally may comprise one or more functional apertures 26 or holes that correspond to the optional apertures in cover 12, which correspond in shape, size and location to the size, shape and location of function keys or other items that must remain free of obstruction (such as the charging port, the antenna, the camera view finder, and the like).

The cushion insert 26 also optionally may comprise one or more perforations 40 formed in the second recessed impact regions, or elsewhere as desired, to facilitate comformance of the cushion insert 26 into the cover 12.

To assemble the case, the cushion insert 30 may be folded along the second recessed impact regions 36 and inserted into cover 12 such that the raised impact regions 32 are aligned with the receiving apertures 20 and the second recessed impaction regions 36 are aligned with, for example, the corners of the cell phone, such that the raised impact regions 32 are received into and at least partially through the corresponding receiving apertures 20, and a portion of the raised impact regions 32 extends above the upper surface 12a of the cover 12.

When assembled, the raised impact regions 32 protrude from the corresponding receiving apertures 20 on the cover 12, and the first recessed regions 34 between the raised impact regions 32 are disposed underneath the support members 24, between the raised impact regions 32. The protruding raised impact regions 32 function at least to protect the cover and electronic device from impact, and the first and second recessed impact regions 34,36 disposed underneath the cover 12 also absorb energy through the material disposed between the device and the cover. Thus, the case 10 provides impact resistance and energy absorption, as a result of the externally exposed raised impact regions 32 and portions of the cushion insert 12 that are disposed underneath the cover 12, adjacent to the electronic device. Although illustrated herein with receiving apertures 20 adapted to receive raised impact regions 32 therein, cover 12 also can be formed to comprise recessed regions (not illustrated), rather than apertures, to receive the raised impact regions 32 therein.

Figure 17:
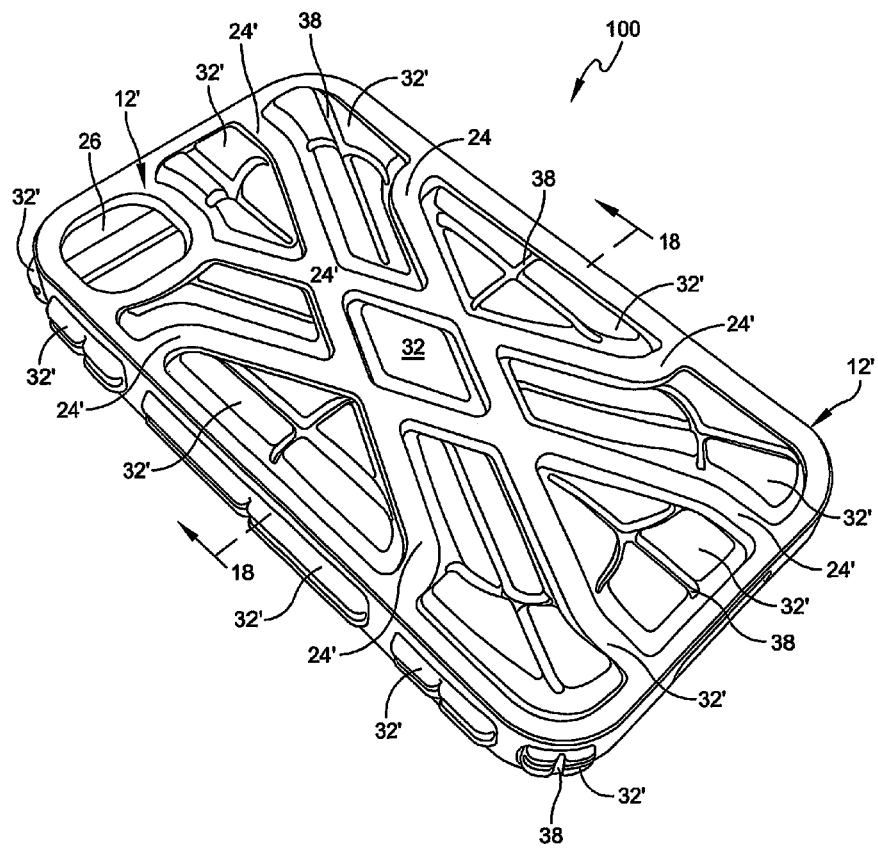
FIG. 17 is a perspective view of an alternate exemplary protective case according to the present disclosure, in an assembled configuration.
Figure 18:
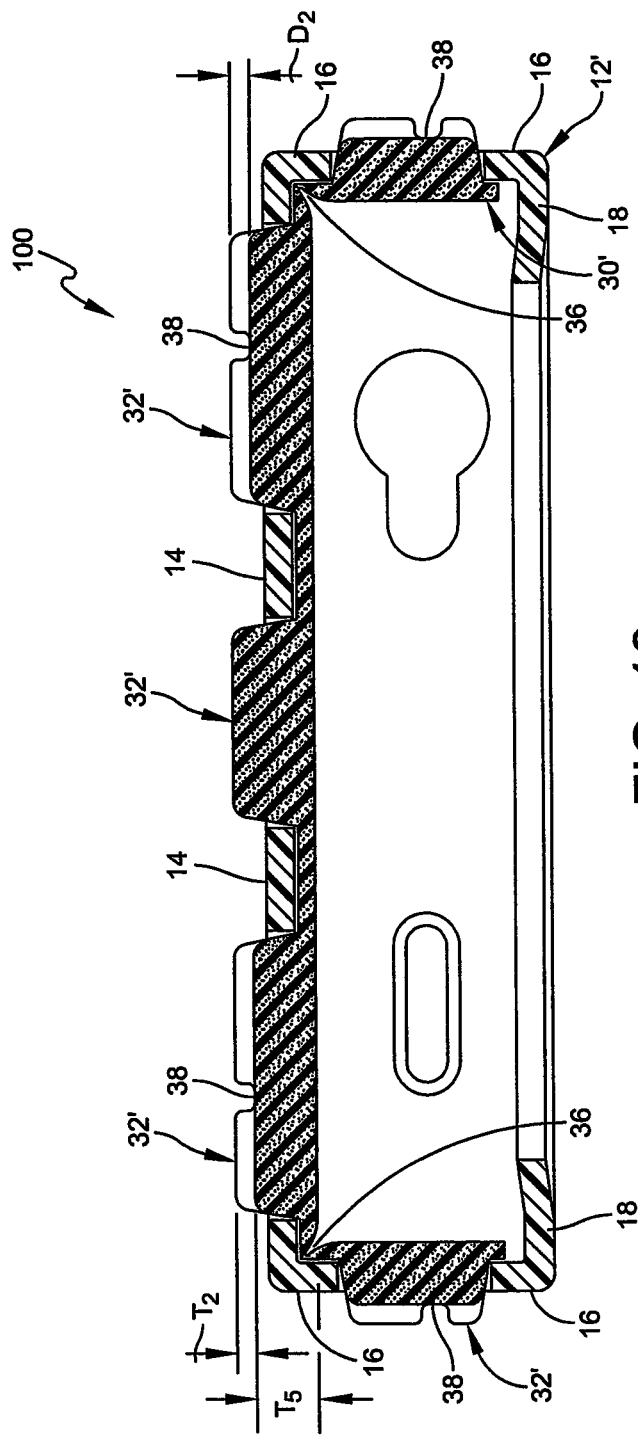
FIG. 18 is cross-sectional view of the protective case shown in FIG. 27, through line 18-18.

Another embodiment of an exemplary case 100 is shown with reference to FIGS. 17-18. Case 100 comprises the same features as case 10, unless otherwise noted herein. In the present embodiment, the receiving apertures 22 and support members 24 in the cover 12' comprise different shapes and sizes, rather than the same shape and size, as in the previous embodiment. Also in the present embodiment, the upper surface 32a of the raised impact regions 32 in the cushion insert 30' comprises grooves 38, which have a thickness $T_5$ less than the thickness $T_2$ of the raised impact regions 32, and greater than the thickness $T_3$ of the first recessed impact regions 34. The grooves 38 provide increased flexibility to the cushion insert 30', and a different aesthetic appearance.

Figure 19:
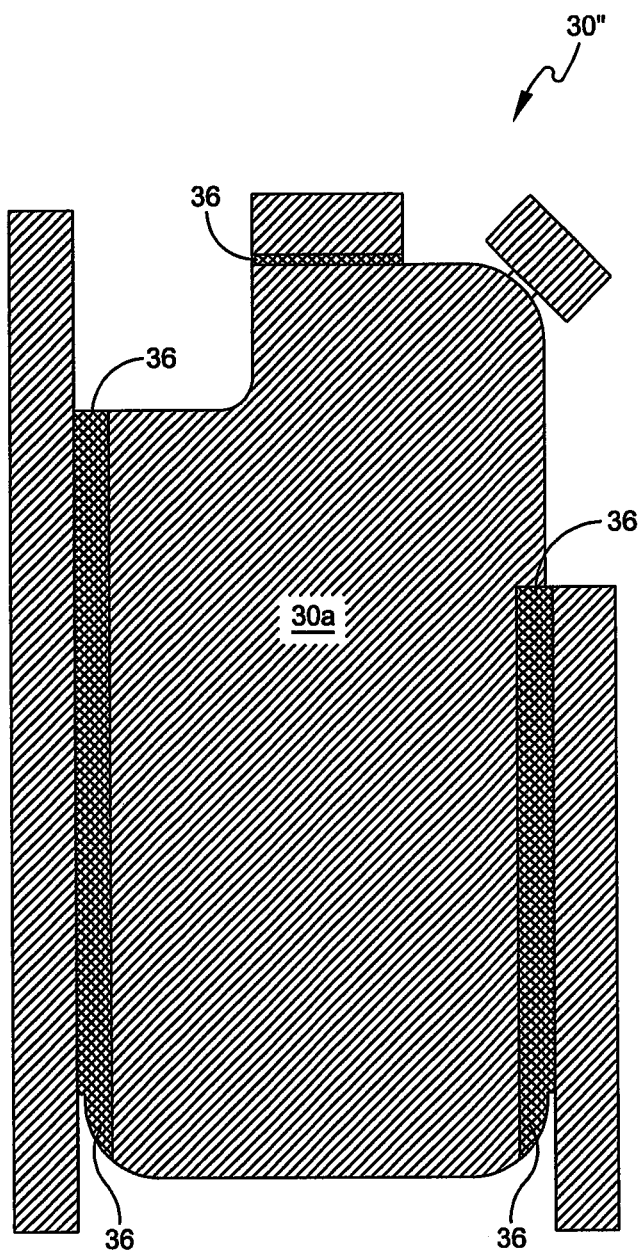
FIG. 19 is top view of an alternate embodiment of the cushion insert shown in FIG. 11.
Figure 20:
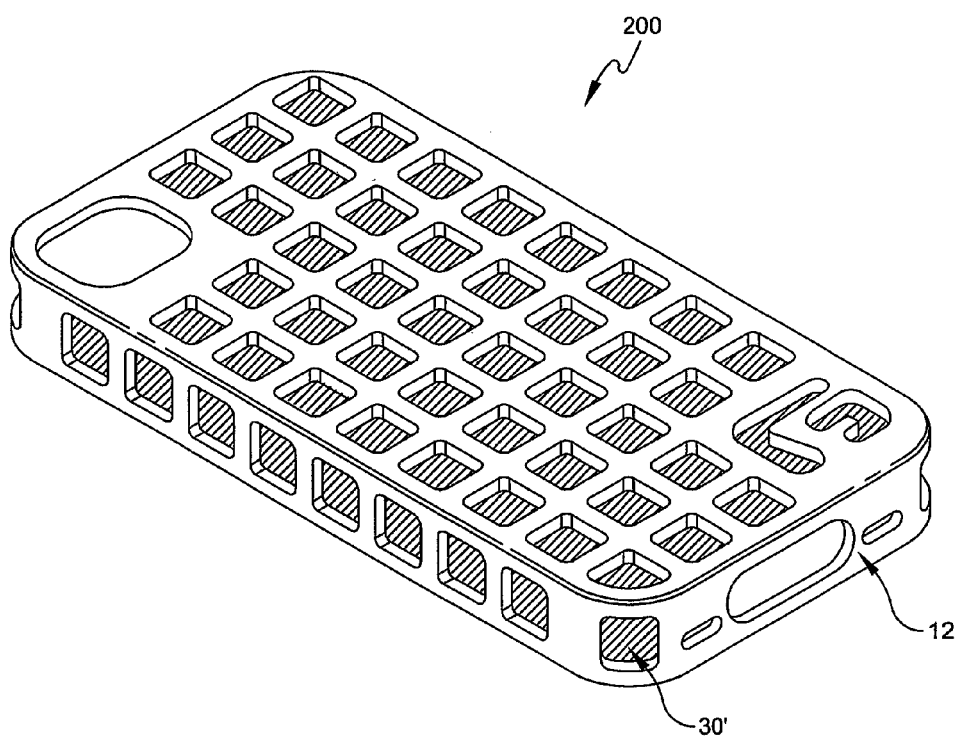
FIG. 20 is a perspective view of an alternate embodiment of an exemplary protective case according to the present disclosure, in an assembled configuration, using the cushion insert shown in FIG. 19.
Figure 21:
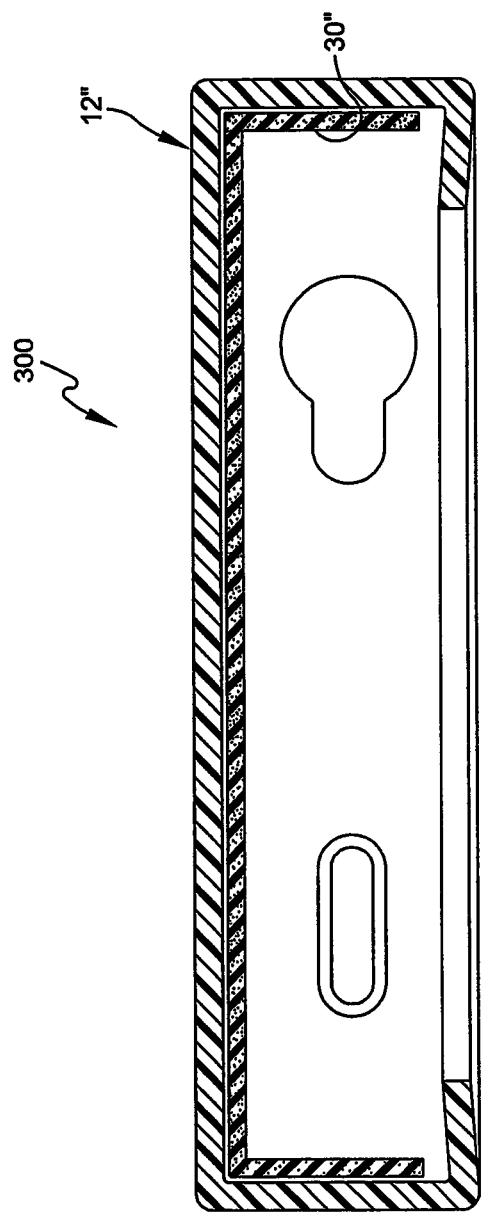
FIG. 21 is a cross-sectional view of an alternate exemplary protective case according to the present disclosure, in an assembled configuration, using the cushion insert shown in FIG. 19, and a cover without any receiving apertures.

Another embodiment of an exemplary case 200 is shown in FIGS. 19 and 20. Case 200 comprises the same cover 12 as in the first embodiment. In the present embodiment, case 200 comprises a cushion insert 30" with a substantially planar cross-section and a uniform thickness, other than second recessed impact regions 36. Thus, when case 100 is assembled, the top surface 30a is exposed through receiving apertures 22, which imparts a different aesthetic appearance than the previous embodiments, particularly when the cover 12 and cushion insert 30" have different colors, patterns, and the like. In the present embodiment, the thickness of cushion insert 30" may be varied in order to obtain the desired amount of impact resistance, and the impact resistance may be increased, while maintaining a relatively thin profile for the case, by using a material with relatively high impact resistance and/or absorption, such as a rate dependent material.

An embodiment of another exemplary case 300 is shown in FIG. 20. In the present embodiment, case 300 comprises the same cushion insert 30" as in the previous embodiment, with a substantially planar cross-section and a uniform thickness, other than second recessed impact regions 36. In the present embodiment, cover 12" also has a substantially planar cross-section with a uniform thickness, other than functional apertures 26 and raised keys 28. As in the previous embodiment, the thickness of the cushion insert 30" may be varied in order to obtain the desired amount of impact resistance, and the impact resistance may be increased, while maintaining a relatively thin profile for the case, by using a material with relatively high impact resistance and/or absorption, such as a rate dependent material.

In all of the foregoing embodiments, the color and/or pattern of both the cover and cushion insert may be varied for aesthetic reasons. The case may be sold as a kit comprising a two or more covers and/or two or more cushion inserts with different colors, patterns and/or graphics, to allow a consumer to swap the covers and cushion inserts, as desired.

FIGS. 13-16 illustrate various embodiments of various exemplary cushion inserts 30 according to the present disclosure that may be used in any of the foregoing cases.

As shown in cross-section in FIG. 13, cushion insert 30 comprises a cushioning layer 50 disposed between optional opposing layers 52,54 and a reinforcing layer 56 disposed between the cushioning layer 50 and layer 54. The reinforcing layer 56 provides the cushion insert 30 with improved tear strength and flexibility, particularly in the second recessed impact region 36, as well as other advantages described below. If desired, layer 56 may be laminated to layer 54, provided layer 56 is porous. Alternatively still, if desired, the foregoing cushion insert 30 can comprise an adhesive layer (not illustrated) disposed between layer 56 and layer 54.

Figure 14:
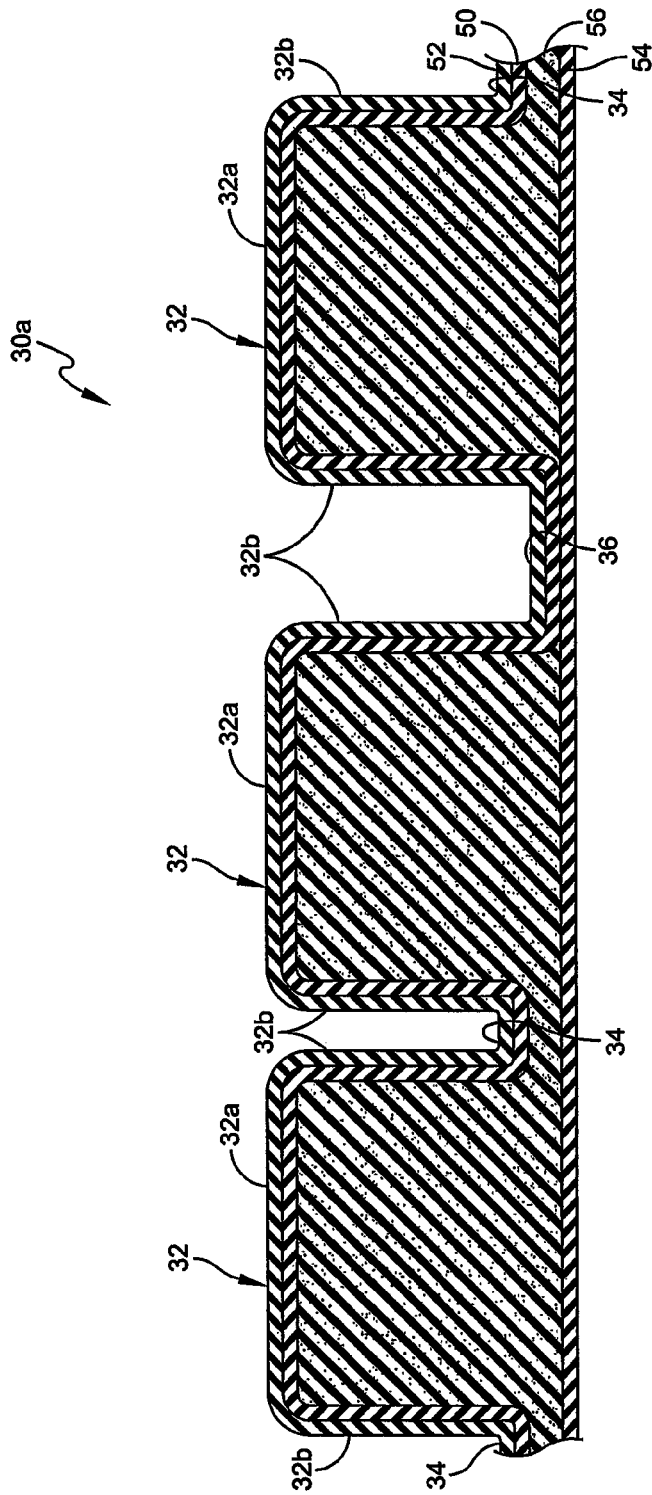
FIG. 14 is cross-sectional view of an alternate embodiment of the cushion insert shown in FIG. 13.

As shown in cross-section in FIG. 14, cushion insert 30a comprises a cushioning layer 50 disposed between optional opposing layers 52,54, and a fabric layer 58 disposed adjacent to layer 52, opposing cushioning layer 50 and lower layer 54. If desired, fabric layer 58 may be laminated to layer 52.

Figure 15:
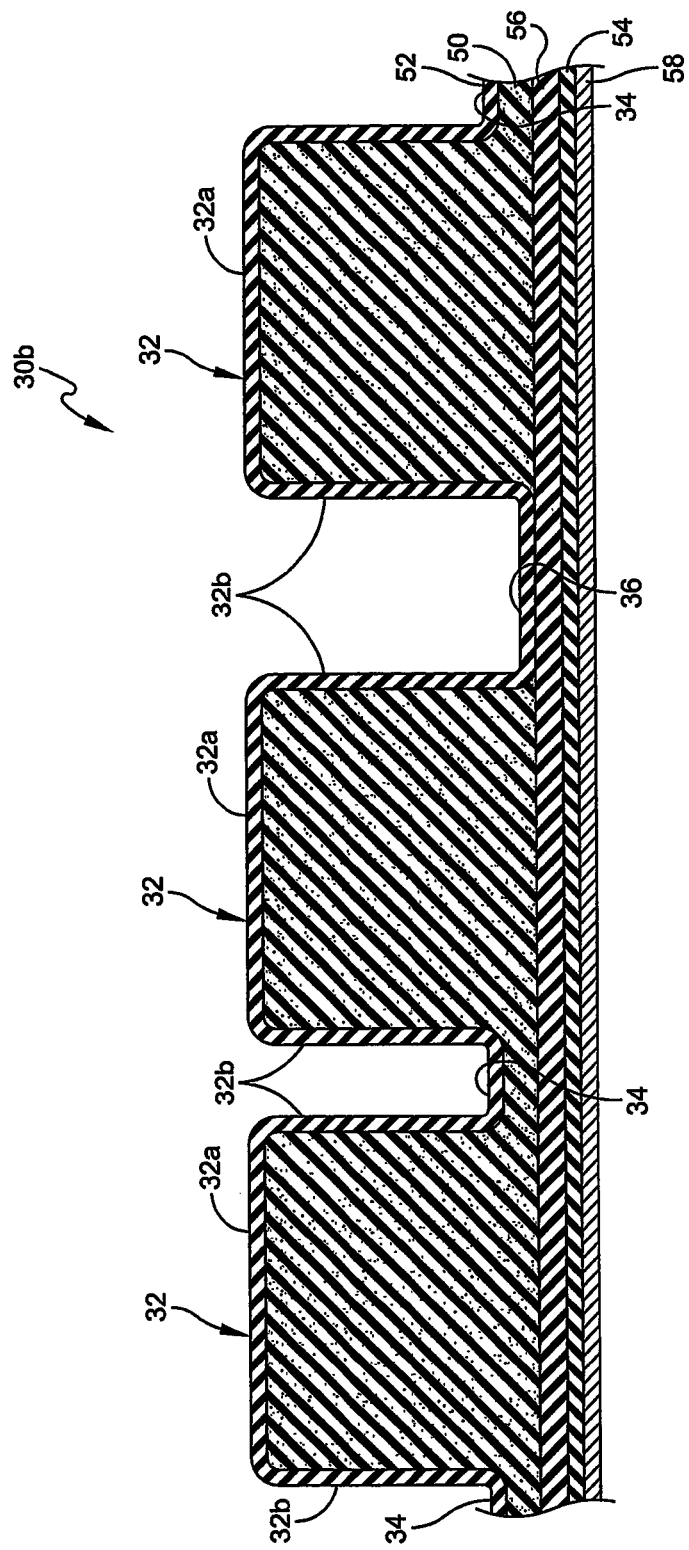
FIG. 15 is cross-sectional view of an alternate embodiment of the cushion insert shown in FIG. 13.

As shown in cross-section in FIG. 15, cushion insert 30b has the same structure as cushion insert 30, and additionally comprises a fabric layer 58 disposed adjacent to layer 54, opposite cushioning layer 50. If desired, fabric layer 58 may be laminated to layer 54.

Figure 15A:
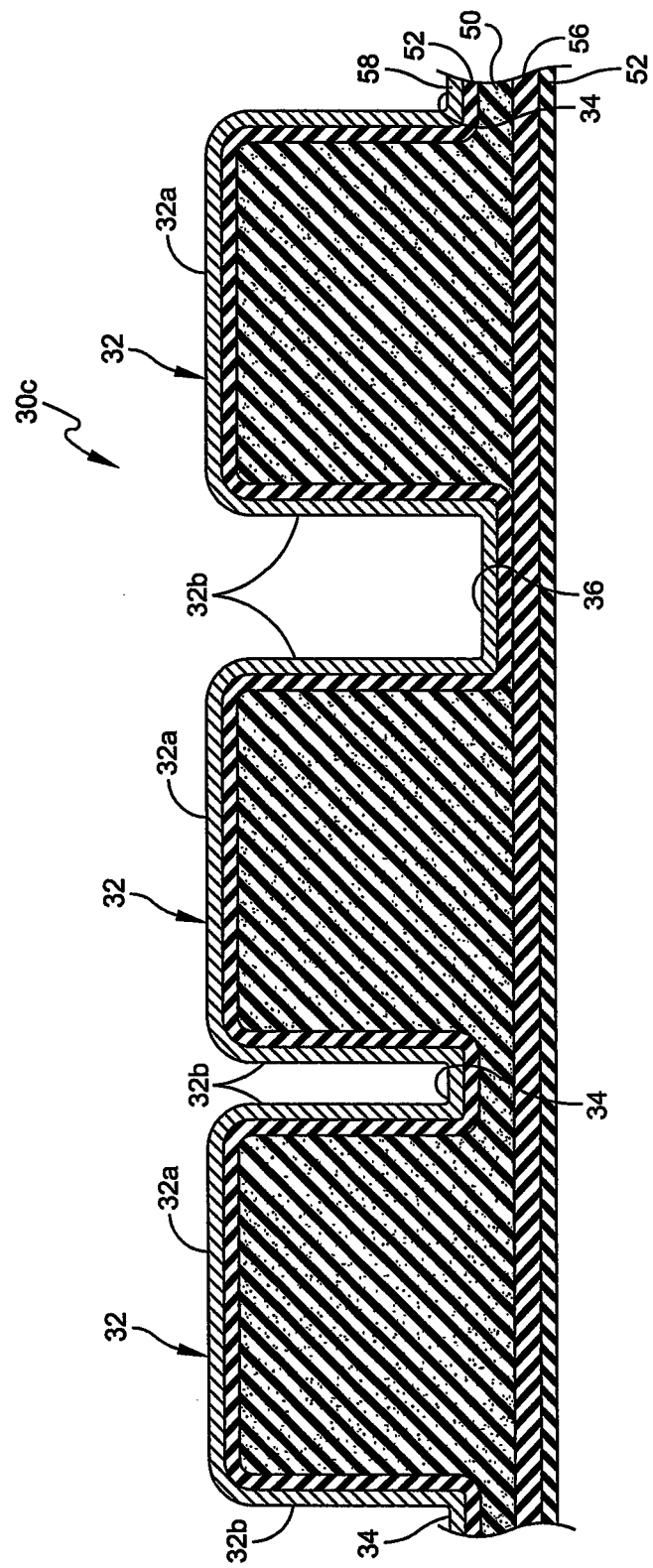
FIG. 15A is cross-sectional view of an alternate embodiment of the cushion insert shown in FIG. 13.

As shown in cross-section in FIG. 15A, cushion insert 30c has the same layers as cushion insert 30b, and additionally comprises a fabric layer 58 disposed adjacent to layer 52, opposite cushioning layer 50. If desired, fabric layer 58 may be laminated to layer 52.

Figure 16:
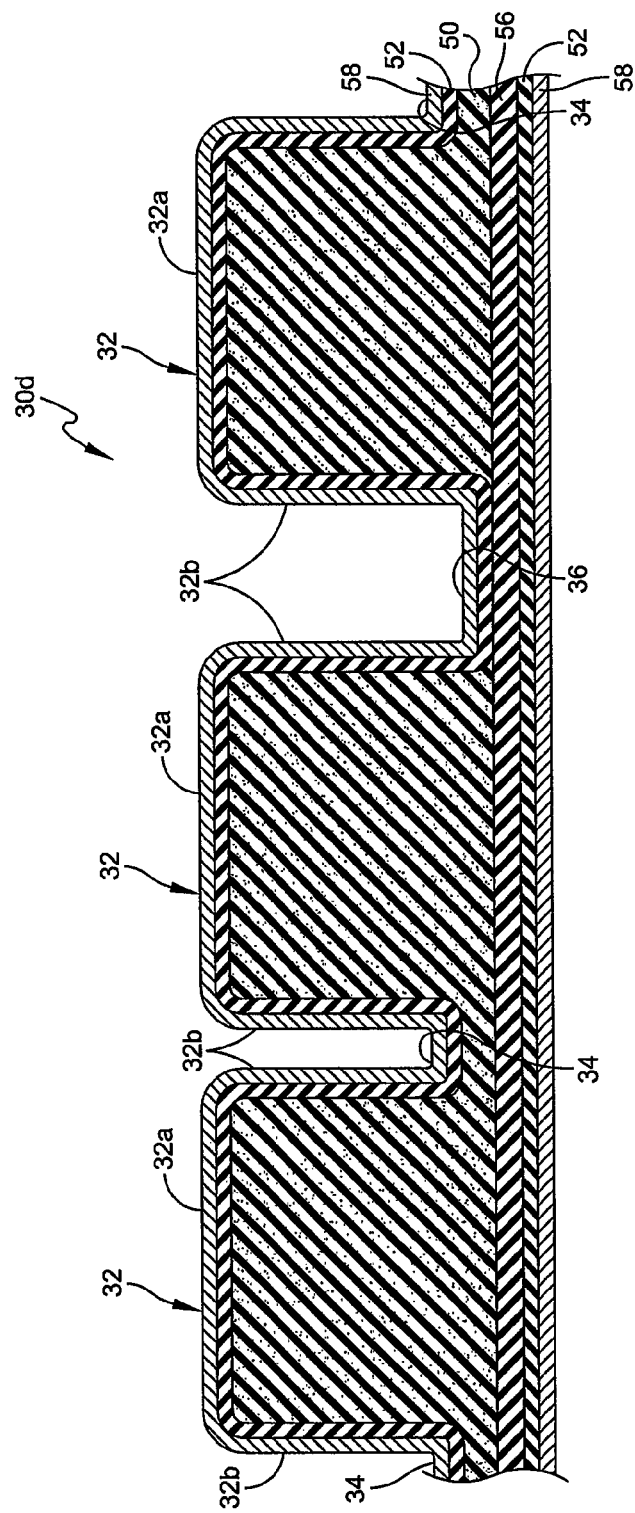
FIG. 16 is cross-sectional view of an alternate embodiment of the cushion insert shown in FIG. 13.

As shown in cross-section in FIG. 16, cushion insert 30d comprises a cushioning layer 50 disposed between opposing upper and lower layers 52, a reinforcing layer 56 disposed between cushioning layer 50 and lower layer 52, and opposing fabric layers 58 disposed adjacent to both layers 52, opposite cushioning layer 50. If desired, fabric layers 58 may be laminated to layers 52.

The position of the reinforcing layer relative to the other layers is not limited to the structures described above, and may be varied, as desired. In addition, the type of material used for any or all of the foregoing layers may be varied, as desired. In addition, any of the foregoing embodiments may further comprise one or more layers of adhesive disposed between any of the layers, as needed or desired. In addition, any of the foregoing structures may be reversed (not illustrated), such that the relative orientation of the layers is reversed from top to bottom.

Suitable materials for the reinforcing material layer 56 include, but are not limited to, materials that are sufficiently porous to allow the flow of the cushioning material through the pores or interstices of the reinforcing material during the molding process, such that the cushioning material directly contacts the barrier layer, and bonds thereto. The bonding process may be chemical, mechanical, thermal, and the like, or a combination thereof, and the like.

Suitable porous reinforcing materials for reinforcing layer 56 include, but are not limited to, woven and nonwoven fabrics, knits, spacer fabrics, scrim, entangled polyesters (including hydro-entangled and/or air-entangled), and the like. Other suitable materials for the reinforcing layer 56 include, but are not limited to, knits or wovens, again either laminated or free floating. The knit could be a circular knit, a warp knit, a spacer knit, and the like. The use of a porous reinforcing layer 56 allows the layer to become saturated with the moldable material and forming a slight surface rigidity of the porous layer, which may provide additional protection during impact, as well as providing additional structural integrity for the cushion insert.

Suitable nonwoven materials include, but are not limited to, airlaid, spunbond, point bonded, stitch bonded, foams, and the like. One suitable nonwoven material is a hydro-entangled polyester with a weight ranging between about 0.1 and about 15 oz per square yard, more particularly between about 0.5 oz and about 5 oz per square yard, and more particularly still about 1 oz. to about 4 oz. per square yard. If nonwoven, reinforcing layer 56 provides improved tear and flex in the recessed impact regions 34,36 with less weight, bulk or expense of a fabric, and the improvements are increased without the optional fabric or lining. The use of the nonwoven for the reinforcing layer 56 also provide a sleek, waterproof and easily cleaned exterior surface, while providing rip resistance in the recessed impact regions 34,36.

Random nonwoven fibers, as opposed to knits or wovens, may provide improved softness, and eliminate or minimize the tendency to "knuckle" when flexed or bent. The random nature of the nonwoven structure may provide improved softness and in some cases better tear strength at the recessed impact regions 34,36.

The use of Kevlar, metal woven or knit fabrics for the reinforcing layer 56 provides piercing and/or or stabbing protection from sharp objects; the use of wire mesh or a bendable porous substrate provides the ability to shape the insert; the use of a spacer fabric improves the tear strength, and provides an additional deflective impact layer; the use of an aerogel nonwoven provides superinsulation; the use of a phase change fabric such as Outlast provides energy storing properties; the use of a static dissipating fabric or nonwoven provides static discharge; the use of active agents, such as silver, provides properties such as antimicrobial activity; the use of selectively die cut fabric or scrim provides areas of selective stretch or strength depending on the size, shape and position of the selected portions of the reinforcing layer; the use of a silicone or other plastic mesh provides heat resistant and/or strength.

In some instances, it may be desirable for the pad to be lightweight, and in such instances, the cushioning material 50 may comprise a foam material, such as a low density foam material. Examples of suitable low density foams include polyester and polyether polyurethane foams. In some instances, it may be desirable for the cushion insert to be capable of providing impact resistance. In such instances, various types of impact absorbing materials have been found suitable for the cushioning material, particularly energy absorbing or rate dependent materials, including foams. For such applications, it can be desirable for such foams to have a density ranging from about 5 to about 35 pounds per cubic foot (pcf), more particularly from about 10 to about 30 pcf, and more particularly still from about 15 to about 25 pcf. Suitable rate dependent foams are available from Rogers Corporation under the brand names PORON® and PORON XRD®, which are open cell, microcellular polyurethane foams.

Suitable materials for the layers 52, 54 include plastics, elastomeric materials such as rubber, thermoplastic elastomers ("TPE"), and/or the like, and combinations comprising at least one of the foregoing materials. Examples of plastics that can be used for the outer layer include, but are not limited to, ethylene-vinyl acetate ("EVA"), nylon, polyester, polyethylene, polyolefin, polyurethane, polyvinyl chloride ("PVC"), polystyrenes, polytetrafluoroethylene ("PTFE"), latex rubber, silicone, vinyl, and combinations thereof. Other possible materials include a variety of other synthetic and/or non-synthetic materials including, but not limited to, paper, fabric, metal, metallized plastic, plastic film, metal foil, and/or the like, as well as composites and/or combinations comprising at least one of the foregoing. Other durable materials can be used for the outer layer including knit, woven and nonwoven fabrics, leather, vinyl or any other suitable material. In some instances, it can be desirable to use materials for the layer than are somewhat elastic; therefore, stretchy fabrics, such as spandex fabrics, can be desirable. The use of stretch fabric as the layer can be desirable because it can improve the flexing of the recessed impact regions and grooves.

In the present embodiment, the thickness of the cushioning layer 50 in reinforcing layer 56 may be minimized during the manufacturing process, such that its thickness approaches zero. As a result, the cushioning material in recessed impact regions, particularly the second recessed impact region 36, may not be visible to the naked eye, or only detectable using very sensitive thickness gauges.

The residual cushioning material remaining in, or in between the layers may assist in bonding the layers together recessed impact regions 34,36. Depending on the materials used, the bonding between layers may be at least partially a chemical, thermal or mechanical bond, or a combination thereof. For example, if the material used as the cushioning layer is a resin, the residual resin in recessed impact regions 34,36 may function as an adhesive to bond the layers together. Use of the resin as a bonding agent may be advantageous, because it eliminates the need for a separate adhesive in recessed impact regions 34,36, and it keeps the bond consistent and equally flexible throughout the cushion insert, which may improve its durability.

Alternatively, if a fabric is used as one of the opposing upper and lower layers 52,54, the bond between the layers in the recessed impact regions 34,36 may be at least partially mechanical, as a result of the resin being squeezed into opening or pores in the fabric, such that portions of layers 56 and 52,54 bond during manufacturing, resulting in "islands" of bonded layers 50,52,54 disposed between islands of bonded layers 52,54

By minimizing or eliminating the cushioning layer 50 in recessed impact regions 34,36, the flexibility of the recessed impact regions 34,36 is maximized, such that the entire cushion insert is capable of bending, flexing, folding and twisting in a variety of direction. For example, the cushion insert is capable of bending or flexing backwards at the second recessed impact region 36 by as much as 180 degrees, and in the forward direction, the flexibility is limited only by the thickness and spacing of the raised impact regions.

In the present embodiment, the presence of the continuous bond between the cushioning material and layers adjacent to the cushioning layer in the recessed impact regions 34,36 is advantageous because it "locks" the raised impact regions 32 in place, minimizing or preventing the egress of cushioning material from the cushion insert 30 or, alternatively, minimizing or preventing the ingress of materials, such as fluids, into the cushion insert 30. Therefore, the recessed impact regions 34,36 stabilize the cushion inserts 30, particularly the cushioning material, such that fluids and other materials are not able to penetrate the cushion insert, which might otherwise lead to delamination.

When the pads are molded with a front layer, a back layer, or both layers, the maximum pad flexibility may be achieved when the recessed impact region thickness approximately corresponds to the combined thickness of the layer(s) other than the cushioning layer, or when the thickness of the cushioning layer approaches zero. For example, in the embodiments described above, layers may be continuously bonded to cushioning layer 50 across the entire cushion insert, including in the recessed impact regions. Depending on the construction of the pad, the outer and inner layers may be bonded to the cushioning layer or to each other, when the amount of material in the recessed impact regions is minimized or eliminated. An advantage of bonding the top layer to the cushioning layer is the ability to provide a continuous, uninterrupted surface above and below the cushioning layer i.e., to encapsulate the cushioning layer, other than at the perimeter of the cushion insert. The continuous bonded layers strengthens the recessed impact regions, minimizing breakage that may otherwise occur due to the flexing during use, because the recessed impact regions are thinner than the raised impact regions. At least one bonded layer may be used for the protection of the thin recessed impact regions areas during flexing. A thermoplastic polyurethane film may minimize or prevent cracking or breaking of layers in the recessed impact regions. Such a layer also may provide strength to the recessed impact regions if bonded to foam. In cases where the thickness of the recessed impact regions is low, especially with little or no film in the recessed impact regions, both inner and outer bonded layers may be desirable to maintain the structural integrity of the pads, with or without the reinforcing layer. It may be desirable to use a material with substantial elasticity for the inner and outer layers, such as TPE films, spandex fabrics, and the like. In some embodiments, the use of a fabric with a laminated film backing may be desirable. A top layer that is a laminate of a fabric and a film, such as a polyurethane film laminate, may be desirable for maximizing the durability of the recessed impact regions.

The present cushion insert also may be designed to enhance air and/or moisture transmission, without significantly compromising protection. The raised and/or recessed impact regions may comprise perforations (not illustrated), which enhances moisture or air transmission rates. The use of a wicking fabric as the bottom layer, or in combination with a TPE film layer as the top layer, can enhance comfort as well and wick moisture through the recessed impact regions.

The use of a high moisture vapor transmissive ("MVT") film layer can further enhance comfort. Such films can function by chemical absorption/desorption. Examples of such films are available under the product name Sympatex, or TX1540 from Omniflex. The use of microporous high MVT films such as Goretex or Porelle (by Porvair) can also be used, or other similar films.

The use of active agents in one or more of the layers may be desirable. For example, the addition of a silver or copper based active agent can provide the material with antimicrobial or antifungal properties. The use of actives in the inner or outer layer or the foam itself can be desirable, such as the addition of silver or copper based actives to act as an antimicrobial or antifungal agent.

Materials for and methods of making the some materials that are useful for the cushion inserts are disclosed in commonly owned and co-pending U.S. patent application Ser. No. 13/208,229, filed on Aug. 11, 2011; and Ser. No. 13/271,594, filed on Oct. 12, 2011, each of which is incorporated herein by reference in its entirety. In addition to the foregoing, suitable materials for the foregoing layers and the adhesive (if used) are disclosed in the afore-mentioned patent applications, and in U.S. Publication Nos. US 2008/0034614 and US 2009/0255625, which also disclose techniques for manufacturing the present cushion inserts; each of the foregoing publications is incorporated herein by reference in its entirety. The molds for the present pads are designed to allow layers to be compressed together under conditions sufficient to minimize or eliminate the foam in the recessed impact regions, for certain embodiments, while allowing the layers to bond together.

Advantages of the present improved cases include, but are not limited to, improved impact protection, particularly on case edges and corners, lighter weight, improved aesthetics, lower manufacturing costs, and less abrasion to the encased article. The improved cases of the present disclosure comprise separable inner and outer interconnected parts that substantially conform to the outer surface of an article to be protected. The protective cases can be adapted for any type of product that requires protection, in addition to those mentioned above.

In addition, many materials, including foam materials, may degrade over time due to wear and abrasion, thereby generating particles that may penetrate into the device and cause functional problems. Having raw foam cells exposed is not desirable as the foam cells can entrap dirt or dust and be unaesthetic and also scratch the device. The encapsulation of the cushioning material between the recessed impact regions provides a protective or barrier layer on one or both of the opposing surfaces of the cushion insert that can prevent or minimize wear, abrasion, particulate formation, and can provide moisture protection to the foam. Thus, the cushion insert can comprise multiple layers, such as a soft foam part with a continuously bonded top surface layer, wherein the top surface of the soft part protrudes through openings in the hard case. In such cases the flat side or bottom layer textile or film can be selected so as to make an lining for the case. The continuous bonded film or fabric layer running across the entire insert provides substantially improved durability in comparison to the foam without the continuous layers.

When the continuous bonded film is used, the thickness of the cushion insert disposed between the raised impact regions may range from 0.020" (twenty thousandths of an inch), but it could be thicker or thinner or could be zero (if the overall shock protection is not needed). A thickness of about 0.020" to about 0.060" is desirable for shock absorbance, without adding too much thickness. The ability to vary the dimensions of the raised and/or recessed impact regions enables customization of the cases as needed for other devices, such as a camera cases, lens cases, luggage, ipads, etc.

One disadvantage of a hard plastic cases used as protective cases for electronic devices is that when a device is dropped, the case cracks frequently and must be replaced. The present protective case has an additional advantage that it protects the hard case from breaking because the protruding raised impact regions first break the impact.

Another disadvantage of many protective cases is that the device inside is more susceptible to breakage from side or edge impacts than from a front or back impacts. In the present cases, the use of impact-absorbing foam for the insert, such as PORON XRD, provides protection from such an impact.

It should be noted that the terms "first," "second," and the like herein do not denote any order or importance, but rather are used to distinguish one element from another, and the terms "a" and "an" herein do not denote a limitation of quantity, but rather denote the presence of at least one of the referenced items. Similarly, it is noted that the terms "bottom" and "top" are used herein, unless otherwise noted, merely for convenience of description, and are not limited to any one position or spatial orientation. In addition, the modifier "about" used in connection with a quantity is inclusive of the stated value and has the meaning dictated by the context (e.g., includes the degree of error associated with measurement of the particular quantity).

Compounds are described using standard nomenclature. For example, any position not substituted by an indicated group is understood to have its valency filled by a bond as indicated, or a hydrogen atom A dash ("-") that is not between two letters or symbols is used to indicate a point of attachment for a substituent. For example, —CHO is attached through carbon of the carbonyl group. Unless defined otherwise herein, all percentages herein mean weight percent ("wt. %"). Furthermore, all ranges disclosed herein are inclusive and combinable (e.g., ranges of "up to about 25 weight percent (wt. %), with about 5 wt. % to about 20 wt. % desired, and about 10 wt. % to about 15 wt. % more desired," are inclusive of the endpoints and all intermediate values of the ranges, e.g., "about 5 wt. % to about 25 wt. %, about 5 wt. % to about 15 wt. %", etc.). The notation "+/−10% means that the indicated measurement may be from an amount that is minus 10% to an amount that is plus 10% of the stated value.

Finally, unless defined otherwise, technical and scientific terms used herein have the same meaning as is commonly understood by one of skill in the art to which this disclosure belongs.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of any appended claims.

What is claimed is:

1. A protective case for an electronic device, comprising:
   a cover that conforms to and engages a portion of the electronic device, the cover having a back portion and a sidewall connected to the back portion, and at least one raised key, the cover comprising interconnected support members defined by a plurality of receiving apertures disposed in predetermined areas, the cover comprising a predetermined thickness;
   a cushion insert comprising raised impact regions disposed adjacent to first recessed impact regions, the raised impact regions disposed in predetermined areas corresponding to the plurality of receiving apertures and having a predetermined thickness greater than the thickness of the cover;
   wherein, when the protective case is assembled onto the electronic device, the plurality of interconnected support members engage with the first recessed impact regions, such that the cover conforms the cushion insert to the electronic device, and the raised impact regions engage with the plurality of receiving apertures.

2. The protective case of claim 1, further comprising one or more second recessed impact regions, wherein the thickness of the second recessed impact regions is less than the thickness of the first recessed impact regions.

3. The protective case of claim 2, wherein the raised impact regions comprise grooves in an upper surface thereof, such that the thickness of the grooves is less than the thickness of the raised impact regions, and greater than the thickness of the first recessed impact regions.

4. The protective case of claim 1, wherein the cushion insert comprises an impact absorbing material.

5. The protective case of claim 1, wherein the cushion insert comprises a multi-layer laminated material.

6. The protective case of claim 4, wherein the impact absorbing material is disposed between opposing upper and lower layers of a thermoplastic elastomeric (TPE) material.

7. The protective case of claim 5, wherein the laminated material further comprises a reinforcing layer disposed between the impact absorbing material and the lower layer of TPE material.

8. The protective case of claim 7, wherein the laminated material further comprises a fabric layer disposed adjacent to the lower layer of TPE material, opposite the impact absorbing material.

9. The protective case of claim 4, wherein the cushion insert is a rate dependent material.

10. The protective case of claim 9, wherein the rate dependent material is a polyurethane foam.

11. The protective case of claim 1, wherein the predetermined thickness of the raised impact regions is sufficient to absorb impacts and/or prevent shocks from the impacts from being transferred to the electronic device.

12. The protective case of claim 1, wherein the case comprises an elastomeric material with a durometer of about 80 Shore A to about 100 Shore A.

13. The protective case of claim 1, wherein the case comprises an elastomeric material with a durometer of about 95 Shore A.

14. The protective case of claim 12, wherein the elastomeric material comprises a thermoplastic polyurethane.

15. The protective case of claim 1, wherein the thickness of the cover ranges from about 0.055" to about 0.095".

16. The protective case of claim 1, wherein the thickness of the first recessed impact regions ranges from about 0.025" to about 0.045".

17. The protective case of claim 2, wherein the thickness of the second recessed impact regions ranges from about 0.010" to about 0.030".

18. The protective case of claim 1, wherein the impact absorbing regions extend above the outer surface of the cover, when the case is in an assembled configuration.

19. The protective case of claim 7, wherein the reinforcing layer is porous.

20. The protective case of claim 7, wherein the reinforcing layer is a nonwoven fabric.

21. The protective case of claim 7, wherein the reinforcing layer is a hydro-entangled nonwoven.

22. The protective case of claim 1, wherein the cover is unitary.

23. The protective case of claim 1, wherein the cushion insert is unitary.

24. The protective case of claim 1, wherein the cover is co-molded with the cushion insert.

25. The protective case of claim 1, wherein the cover and the cushion insert are adhesively connected.

26. The protective case of claim 6, wherein the TPE layers are continuously bonded to the impact absorbing material.

27. The protective case of claim 5, wherein the cushion insert comprises a cushioning material disposed between and continuously bonded to opposing adjacent layers.

28. The protective case of claim 2, wherein, when the case is assembled, the cushion insert is folded on the second recessed impact regions and inserted into the cover such that the raised impact regions are aligned with the receiving apertures and the second recessed impaction regions are aligned with the corners of the case.

29. The protective case of claim 28, wherein, when the case is assembled, the raised impact regions are received into and at least partially through the receiving apertures and a portion of the raised impact regions extend above the upper surface of the cover.

30. The protective case of claim 1, wherein the case comprises an elastomeric material with a durometer ranging from about 80 Shore A to about 100 Shore A, and the case insert comprises a rate dependent polyurethane foam with a density ranging from about 5 to about 35 pounds per cubic foot.

31. A protective case for an electronic device, comprising:
a cover that conforms to and engages a portion of the electronic device, the cover having a back portion and a sidewall connected to the back portion, the cover comprising interconnected support members defined by a plurality of receiving apertures disposed in predetermined areas, the cover comprising a predetermined thickness of an elastomeric material having a durometer ranging from about 80 Shore A to about 100 Shore A;
a multi-layer cushion insert comprising raised impact regions disposed adjacent to first recessed impact regions, the raised impact regions disposed in predetermined areas corresponding to the plurality of receiving apertures and having a predetermined thickness greater than the thickness of the cover, the cushion insert comprising a multi-layer continuously bonded material comprising a rate dependent foam disposed between opposing layers of a thermoplastic elastomeric material (TPE), and a reinforcing layer disposed between the rate dependent foam layer and one of the TPE layers;
one or more second recessed impact regions having a thickness less than the thickness of the first recessed impact regions;
wherein, when the protective case is assembled onto the electronic device, the plurality of interconnected support members engage with the first recessed impact regions, such that the cover conforms the cushion insert to the electronic device, and the raised impact regions engage with the plurality of receiving apertures, such that the raised impact regions extend above the outer surface of the cover.

32. A protective case for an electronic device, comprising:
a cover having a back portion and a sidewall connected to the back portion that engages the electronic device, the cover comprising a material that conforms to a portion of the electronic device, the cover having a predetermined thickness, the cover further comprising interconnected support members defined by a plurality of receiving apertures disposed in predetermined areas;
a cushion insert comprising a rate dependent material, such that when the cushion insert is disposed in the cover, the cover conforms the cushion insert to the electronic device.

33. The protective case of claim 32, the cushion insert further comprising raised impact regions disposed adjacent to first recessed impact regions portions, the raised impact regions disposed in predetermined areas corresponding to the plurality of receiving apertures and having a predetermined thickness greater than the thickness of the cover, the raised impact regions engaged with the plurality of receiving apertures such that the raised impact regions are coplanar with the outer surface of the cover, and the plurality of interconnected support members disposed in, and engaged with, the first recessed impact regions portions, when the cover conforms the cushion insert to the electronic device.

34. The protective case of claim 1, wherein the at least one raised key corresponds to a functional key on the electronic device.

\* \* \* \* \*